United States Patent Office 2,963,004
Patented Dec. 6, 1960

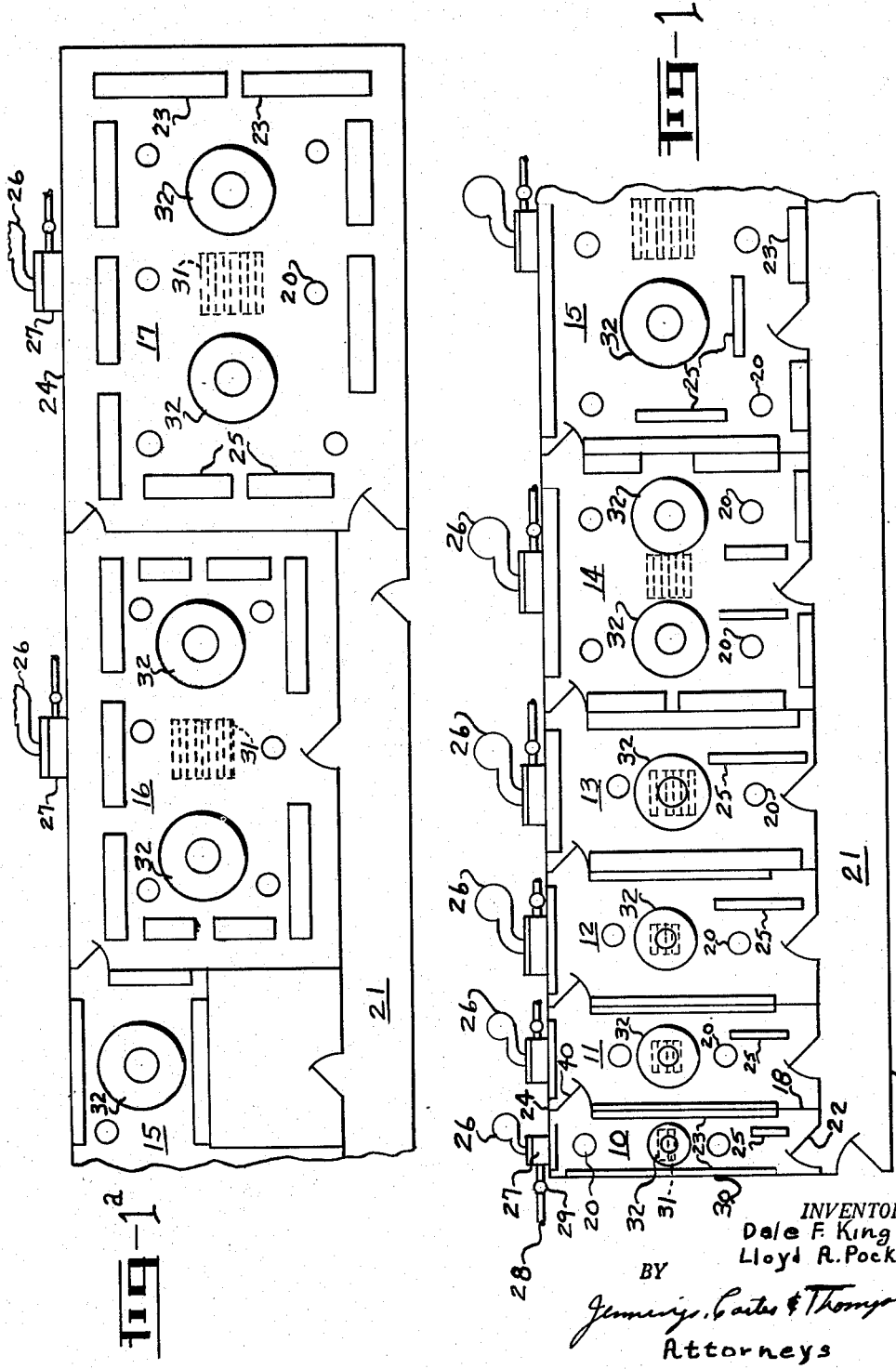

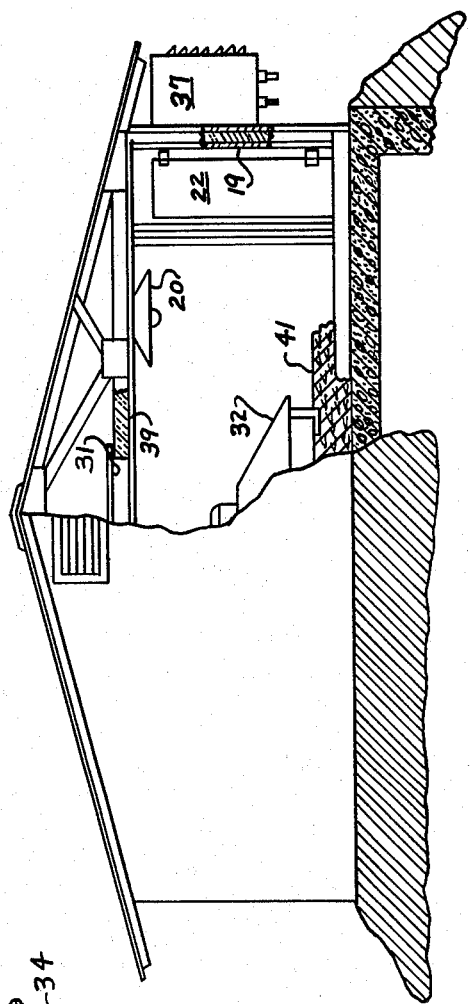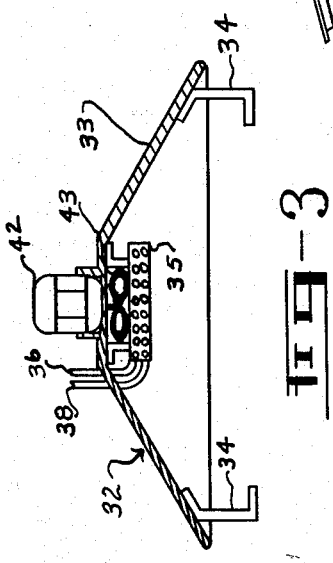

2,963,004

PROCESS FOR RAISING POULTRY

Lloyd A. Pockman, % L. A. Pockman Mfg. Company, Decatur, Ala., and Dale F. King, % Alabama Polytechnic Institute, Auburn, Ala.

Original application May 24, 1956, Ser. No. 586,943, now Patent No. 2,910,044, dated Oct. 27, 1959. Divided and this application June 8, 1959, Ser. No. 818,599

7 Claims. (Cl. 119—51)

Our invention relates to a process for raising poultry, and has for an object the provision of such process by means of which poultry may be raised from day old size to marketable size, namely, to broiler size, and age at a minimum overall total cost per pound and in minimum time. This invention is a division of our copending application Serial Number 586,943, now Patent Number 2,910,044, filed May 24, 1956 "Process and Plant for Raising Poultry and the Like."

In the art to which our invention relates it is known that many environmental conditions affect the rate of growth, general health and overall condition of poultry. For instance, it is known that many variables such as the amount of light, the temperature, and ventilation existing in the living space of chickens all affect optimum growing conditions thereof from day old up to around 8 or 9 weeks in age. It is variously suggested in the literature on the subject that there might be some relation between these factors of light, temperature and ventilation. Insofar as we are aware there has never been disclosed any practical way to put to use any relative relationships between these factors which would result in decreasing the overall cost of producing poultry meat.

With the foregoing in mind one of the objects of our invention is to provide a process for raising chickens from one day old through broiler age of 8 to 9 weeks which comprises controlling all of the foregoing factors within limits and which further comprises allotting to each chicken a definite amount of living area which varies from approximately .16 square foot per chicken during the first week of the growth period to approximately 1 square foot per chicken during the eighth week of the growth period.

Another object is to control the ventilation provided for each age group of chickens within a range to maintain minimum adequate fresh air, thus reducing the cost of heating or cooling the living space for the chickens.

Another object of our invention is, simultaneously with gradually increasing the living room for the chickens, to decrease the living room temperature from around 90 degrees F. during the first week to around 70 degrees F. during aproximately the fifth through the eighth weeks, while simultaneously with said temperature change varying the periods of light and darkness within the limits hereinafter set forth, all to the end that the overall environmental conditions in which the chickens live are such that maximum growth with minimum feed requirements is attained.

It is a further object of our invention to provide a process for raising chickens and the like in which by definitely controlling the periods of light and darkness, cannibalism among the chickens is substantially eliminated, eliminating the requirement of debeaking the chickens.

A further object of our invention is to provide a process of the character indicated in which there is maintained in each room in which the chickens are housed and when necessary a zone of cool air surrounded by a zone of warmer air, these zones being maintained close to the floor level, whereby the chickens themselves may select the most comfortable temperature zone, thus promoting not only optimum consumption of feed by each chicken but also providing an environmental temperature zone ideally suited to each individual chicken.

Briefly, our invention may be carried out by providing a house in which the chickens are to be kept. The house may conveniently be divided by partitions whereby there are provided rooms of different total floor areas. Each of these rooms may be provided with a source of heat, a source of fresh air, a source of cool air, and a means to control the light. The building should be windowless, thus saving a considerable amount in construction cost. Day old chicks are started in our process by placing them in the smallest room of the building. The temperature over a part of the floor, and in what we will hereinafter sometimes refer to as a "comfort zone," preferably is maintained in the range of 89 degrees to 94 degrees F. We maintain light in the room 24 hours per day during the first week of the growing cycle. In the room for week old chicks we change the air approximately each 30 minutes. At the end of the first week the chickens are moved to the second room in the building where the foregoing conditions are varied as will hereinafter be explained. Each week the entire flock of chickens is moved to the next room, each of which is larger in total square feet than the preceding one. It will thus be seen that a new group of chickens can be started each week and that no space is wasted in carrying out our improved process. We porportionately increase the square footage allotted to each chicken as it increases in size and age.

A plant which may be used to carry out our improved process is shown in the accompanying drawings forming a part of this application in which:

Fig. 1 is a wholly diagrammatic plan view of a chicken house which may be used to carry out our process, the figure being the left hand end of the house;

Fig. 1ª is a view similar to Fig. 1 and showing the right hand end of the building as the same is viewed in said␣Fig. 1;

Fig. 2 is an end elevational view of the building partly in section; and,

Fig. 3 is an enlarged detail sectional view through one of the air cooling units.

Referring now to the drawings for a better understanding of our invention we show in Figs. 1, 1ª and 2, a building which may be generally rectangular in shape. By way of example the building may be 24 feet wide, approximately 265 feet long, and 7 feet from floor to ceiling. The building is windowless, and the doors into the various rooms are made fairly air tight and substantially light proof.

At the left hand end of the building, Fig. 1, we show a room 10 which is designed as the room for the first week of the growing period, a room 11 the second week, room 12 for third week, room 13 for fourth week, and so forth, through room 17, which last numbered room is the one for chickens eight weeks old. In view of the fact that except for size the rooms are substantially identical, a description of the smaller one will, except as noted, suffice for all. It will first be seen that room 10 is separated from room 11 by a partition wall 18. The building may conveniently have an outer wall 19 which defines a walkway or hall 21. A door 22 opens from the hall 21 into room 10, whereby the attendant may gain access to the room.

Near wall 18 and near the end wall 30 of the building we may place feeder troughs 23 whereby there is available, at all times, an adequate supply of feed. It will also be understood that there is provided at all times in all the rooms an ample supply of water in standard watering troughs indicated diagrammatically at 25.

Placed on the outside of the outer wall 24 of the building to discharge thereinto is an air fan 26. The fan may blow air over a heater coil 27 to which a heating medium may be supplied from a source, not shown, through a pipe 28 under control of a valve 29. In the ceiling of the room 10 is an air vent 31. In the room 10 we provide a source of light which is indicated diagrammatically by the incandescent electric lamps 20. There may be a small door 40 in the wall 18 through which the chickens may be passed to the next room 11 as will be explained.

In the room 10 and in all the other rooms, we may place our improved air cooling unit indicated generally by the numeral 32, see Fig. 3. In addition rooms 10, 11 and 12 may be provided with any desired source of heat at the floor level. The air cooling unit 32 may consist of an inverted shell-like housing 33 which is supported above the floor level on legs 34. In the upper part of the housing we provide a cooling coil 35. Coolant may be supplied to the coil 35 through a conduit 36 from a compressor unit 37 located on the outside of the building as shown in Fig. 2. A return line for the system is indicated at 38.

Mounted above the cooling coil 35 is an electric motor 42. A fan 43 is driven by the motor and circulates air through the cooling coil, to cool the air.

The building preferably is insulated throughout its walls as well as overhead as indicated at 39. In addition we prefer to place on the floor a layer of material such as dry pine shavings 41 or the like as is customary.

With the foregoing construction in mind it will be seen that we are enabled to place a batch of chickens in room 10, maintain them there under the ideal environmental conditions set forth herein and then to move them to the next room, and so on. By way of example a satisfactory building having an overall width of twenty-four feet, and divided into eight rooms as indicated will accommodate a continuous production cycle of 1000 chickens per week through eight weeks old, that is, to broiler size. To accomplish this we divide the building in such a manner that room 10 is eight and one-half feet long; room 11 thirteen feet long; room 12 sixteen feet long; room 13 twenty-six feet long; room 14 forty feet long; room 15 sixty-eight feet long; room 16 fifty-two and one-half feet long; and room 17 forty-one and one-half feet long. We prefer to place in one of the rooms, for instance room 15, all of the controls for all of the rooms and we have thus increased the total square footage in that room to make up for the space used as a control room. It will be noted from Figs. 1 and 1a that all of the rooms except room 17 are nineteen feet wide, whereas room 17 is as wide as the building, a full twenty-four feet wide.

As an example of the advantages of our invention, we started, in a room similar to but proportionately smaller than room 10, 400 Vantress X New Hampshire day old chicks. These were obtained from a hatchery 175 miles away from the place where we had constructed our improved plant. The chickens were shipped in the standard chick boxes and were started at 6 p.m., January 19, 1956. Since this room was 7 by 9 feet this was a total allocation of .16 square feet per chick. During the first week the average temperature in room 10 was 70 degrees to 75 degrees F. However, due to the presence of the floor level heat sources, the chicks had access to floor level areas heated to around 94 degrees F. We maintained 24 hours of light and no hours of darkness during the first week. We so regulated the blower 26 that we completely changed the air in said room once every 30 minutes. At the end of the first week the chickens were moved into a room similar to but proportionately larger than room 10, and so on through the eighth week.

The following table shows the relationship of the square footage per bird, the average room temperature, and the amount of ventilation throughout the eight weeks growth period:

| Age, Wks. | Encl. in sq. ft. | Sq. Ft. per Chicken | Average Room Temp. | Ventilation changes, cu. ft. per min. per chicken | Light Schedule In Hours |
|---|---|---|---|---|---|
| 1 | 7 x 9 | .16 | 74 | .2 | 24L, 0D. |
| 2 | 10 x 10 | .25 | 75 | .6 | 24L, 0D. |
| 3 | 10 x 12 | .30 | 73 | 1.0 | 21L, 3D. |
| 4 | 10 x 20 | .50 | 70 | 1.4 | 9L, 3D, 9L, 3D. |
| 5 | 15 x 20 | .75 | 69 | 1.8 | 5L, 3D, 5L, 3D, 5L, 3D. |
| 6 | 20 x 20 | 1.00 | 68 | 2.2 | 3L, 3D, 3L, 3D, 3L, 3D, 3L, 3D. |
| 7 | 20 x 20 | 1.00 | 72 | 2.6 | 2L, 3D, 2L, 3D, 2L, 3D, 2L, 3D, 1L, 3D. |
| 8 | 20 x 20 | 1.00 | 69 | 3.0 | 1L, 3D, 1L, 3D, 1L, 3D, 1L, 3D, 1L, 3D, 1L, 3D. |

A study of this table will show that during the first week we supplied relatively little ventilation to the chicks whereas during the second week we operated the fan at such rate as to change the air approximately 3.9 times per hour. During the fourth week this figure was raised to 11.5 and during the fifth week to 13. During the sixth week, it became necessary to operate the cooling unit 32 in the room corresponding to room 15.

In the particular flock of chickens which we have raised by our improved process and with our improved plant we started with the type of chicks heretofore mentioned which cost 16¢ each. The following table sets forth the percentage of mortality, average weight in pounds at the ends of the periods, feed consumed in pounds per pound of gain, total chick and feed cost, and total cost per pound of broiler at the end of each weekly period.

| Age, Wks. | Percent Mort. | Av. Wt., Lbs. | Feed Cons. to Date | Feed Cons., lbs. per lbs. gain | Total Chick and Feed Cost | Broiler cost per Lb. |
|---|---|---|---|---|---|---|
| 1 | ¼ of 1 | | | | | |
| 2 | 0 | .44 | 300 | 1.67 | $80.20 | $0.45 |
| 3 | 0 | .73 | 500 | 1.70 | 91.00 | 0.30 |
| 4 | 0 | 1.12 | 850 | 1.84 | 109.90 | 0.24 |
| 5 | 0 | 1.70 | 1,250 | 1.90 | 131.50 | 0.19 |
| 6 | 0 | 2.20 | 1,700 | 1.90 | 155.80 | 0.174 |
| 7 | 0 | 2.71 | 2,250 | 2.04 | 185.50 | 0.168 |
| 8 | 0 | 3.20 | 2,800 | 2.15 | 215.20 | 0.164 |

None of the chicks were debeaked, and half were male and half were female. Our weights were determined by weighing one-fourth of all the chicks, individually, one-half males and one-half females, at the end of the weekly periods as indicated.

By comparison with the figures just set forth it will be obvious to those skilled in the art that we have considerably reduced the cost per pounds of meat by our improved process over the national average among skilled poultrymen. For instance, an official three year summary of results of a typical closely controlled experiment shows that during 1955 with 210,616 chickens the average feed consumption per pound of meat produced was 2.63 pounds. The average age at which the broilers were sold was 9 weeks 3 days whereas with our improved process we sell them at the end of 8 weeks. The average weight of the closely controlled experiment was 2.84 pounds at the end of 9 weeks 3 days, whereas the average weight of the chickens raised by our improved process at the end of 8 weeks was 3.20 pounds. The cost per pound of meat in 1955 closely controlled experiment was 19.1¢ whereas in ours it was 16.4¢. We note no major differences in the cost of feed or the cost of chicks as between the two examples.

In observing chickens in our improved plant and when being raised by our improved method we note that around each of the cool air units 32 there is a zone, outside said hood, which appears to be perfectly comfortable for the chickens. That is to say, the chickens seem naturally to move into that zone which is the most comfortable for them temperature-wise. By placing the units 32 in each room so that cool air is supplied thereby it is not necessary to cool the air of the entire building or room. The chickens come close enough to the edges of the coolers 32 where each individual chicken is most comfortable, remain there for a few minutes, then move over to the feed troughs where they consume as much feed as they desire. When they become too warm they move back to the cooler area. This arrangement eliminates the necessity of having to cool the entire volume of air in each room, the cost of which would be extremely high. At the same time it affords a flexible comfort zone wherein the individual chickens, depending upon how each one is feathered out, may find the most comfortable place and hence the place most conductive to high feed intake and rapid growth.

In carrying out our tests we fed the chickens feed suitable for the particular age, the type and kinds of which will be apparent to those skilled in the art. The chicks were not vaccinated for any disease but were fed a drug to prevent coccidiosis through the growth period. An example of such drug is sold under the trade name "Nicarbazin" by Merck and Company, Inc. By following the light schedule as indicated in the table for the different ages, we substantially eliminated cannibalism and hence eliminated for all practical purposes losses of chickens from this cause.

From the foregoing it will be apparent that we have devised an improved process and plant for the economical production of chickens. In actual tests we have found that our invention saves approximately 15% in the cost of producing chickens over the best processes and methods heretofore known to us. Our improved plant is particularly advantageous and the apparatus for maintaining a temperature comfort zone which eliminates the necessity of cooling the air of an entire room is important and represents a considerable saving in investment.

While in this specification and in certain of the appended claims we speak of periods of light and periods of darkness, we have found that the same results can be obtained by dimming the light. That is, if the light schedule calls, for instance, for 3 hours of light (meaning 3 hours of light of an intensity of at least one foot candle at floor level) and 3 hours of darkness, it is satisfactory to employ one-half candle intensity for 6 hours. Proportionate reductions in intensity can be made for other light schedules. Thus, we may obtain the result of decreasing the light as the chickens get older either by periods of bright light of at least one foot candle at floor level and periods of total darkness, or by decreasing the intensity over longer periods.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The process of raising chickens from the freshly hatched stage to broiler stage which comprises gradually increasing during substantially an eight week period the floor area allotted to each chicken from about .16 sq. ft. to about one sq. ft. while at the same time gradually increasing the ventilation changes from about .2 cubic foot per minute per chicken to about 3.0 cubic feet per minute per chicken, gradually decreasing the average temperature from about 74° F. to about 69° F.; and gradually decreasing the light from 100% to about 25%.

2. In the process of raising a flock of chickens, the steps of placing them when approximately one day old in an enclosure having an allotted floor space of approximately .16 square foot per chicken, changing the air in said enclosure approximately .2 c.f.m. per chicken, maintaining light in said enclosure 24 hours per day of an intensity of at least one foot candle at floor level, maintaining the temperature of the air in said enclosure available to the chickens at a range of between 69° F. and 94° F., maintaining adequate supplies of feed and water within the enclosure, and removing the chickens from the enclosure at the end of approximately 7 days.

3. The process of raising chickens during the growth period of approximately one day to approximately 8 weeks old which comprises the steps of placing the chickens in a substantially light proof enclosure, providing artificial light in said enclosure, maintaining a limited zone of air in the enclosure adjacent the floor level therein which is cooler than the remainder of the air in the enclosure adjacent the floor level, maintaining feed and water supplies in the enclosure located out of said cool air zone, and periodically changing the air in said enclosure.

4. The process of claim 3 which includes the further step of progressively increasing the allotted square feet of floor space in said enclosure per chicken commencing with approximately .16 square foot per chicken during the first week of age to approximately 1 square foot per chicken during the sixth through eighth weeks of age.

5. The process of increasing the yield of edible poultry per pound of feed which comprises the steps of placing approximately one day old chickens in a substantially light proof enclosure having a floor area equal substantially to .16 square foot per chicken, leaving the chickens in said enclosure for approximately one week, moving the chickens to a second similar enclosure having a floor area equal substantially to .25 square foot per chicken and keeping them there for approximately one week, moving the chickens to a third similar enclosure having a floor area equal substantially to .30 square foot per chicken and leaving them there for approximately one week, moving the chickens to a fourth substantially similar enclosure having a floor area equal substantial to .50 square foot per chicken and keeping them there for approximately one week, moving the chickens to a sub- stantially similar enclosure having a floor area equal substantial to .75 square foot per chicken and keeping them there for approximately one week, moving the chickens to an enclosure having a floor area equal substantially to 1.00 square foot per chicken and keeping them there for three weeks, providing artificial light in said enclosures, progressively decreasing the period of light in said enclosures commencing with substantially full 24 hours per day of light during the first week to alternate periods of approximately 3 hours of light to approximately 3 hours of darkness during the sixth week, and progressively decreasing the average temperature in said enclosures approximately 1° F. per week commencing with the first enclosure at approximately 74° F.

6. In the process of raising a flock of chickens, the steps of placing them when approximately one day old in a substantially light proof enclosure, and in growing the chickens until approximately 8 weeks old by moving them from one light proof enclosure to the other and maintaining them therein substantially in accordance with the factors set forth in the following schedule:

| Age, Wks. | Encl. Area in Sq. Ft. | Sq. Ft. per Chicken | Average Room Temperature | Ventilation changes per cu. ft. per min. per chick. | Light Schedule in Hours |
|---|---|---|---|---|---|
| 1 | 7 x 9 | .16 | 74 | .2 | 24L, 0D. |
| 2 | 10 x 10 | .25 | 75 | .6 | 24L, 0D. |
| 3 | 10 x 12 | .30 | 73 | 1.0 | 21L, 3D. |
| 4 | 10 x 20 | .50 | 70 | 1.4 | 9L, 3D, 9L, 3D. |
| 5 | 15 x 20 | .75 | 69 | 1.8 | 5L, 3D, 5L, 3D, 5L, 3D. |
| 6 | 20 x 20 | 1.00 | 68 | 2.2 | 3L, 3D, 3L, 3D, 3L, 3D, 3L, 3D. |
| 7 | 20 x 20 | 1.00 | 72 | 2.6 | 2L, 3D, 2L, 3D, 2L, 3D, 2L, 3D, 1L, 3D. |
| 8 | 20 x 20 | 1.00 | 69 | 3.0 | 1L, 3D, 1L, 3D, 1L, 3D, 1L, 3D, 1L, 3D, 1L, 3D. |

7. In the process of raising chickens, the steps of maintaining the chickens in an enclosure which is substantially light proof and at a temperature of approximately plus or minus 20 degrees F. of their optimum enviromental temperature throughout the growth period of from one day old to 8 weeks old, continuously during the growth period changing the air available to said chickens at a rate equal approximately to .2 cu. ft. per minute per chicken at one day old to approximately 3.0 cu. ft. per minute per chicken at 8 weeks old, controlling the light in said enclosure commencing with 24 hours per day of light for the first two weeks of the growth period to a variation consisting of one hour of light to three hours of darkness during the 8th week, and maintaining the chickens in an alotted square foot of floor space per chicken in said enclosure commencing at approximately .16 square foot per chicken during the first week of the growth period and increasing to approximately 1 square foot per chicken to and including the 8th week.

No references cited.